(12) United States Patent
Ellison

(10) Patent No.: US 10,582,189 B2
(45) Date of Patent: Mar. 3, 2020

(54) SYSTEM AND METHOD FOR GENERATING COMPOSITE IMAGES

(71) Applicant: Conflu3nce Ltd., Jerusalem (IL)

(72) Inventor: Tami Ellison, Jerusalem (IL)

(73) Assignee: CONFLU3NCE LTD., Jerusalem (IL)

( * ) Notice: Subject to any disclaimer, the term of this patent is extended or adjusted under 35 U.S.C. 154(b) by 208 days.

(21) Appl. No.: 15/884,565

(22) Filed: Jan. 31, 2018

(65) Prior Publication Data

US 2018/0220124 A1 Aug. 2, 2018

Related U.S. Application Data

(60) Provisional application No. 62/499,655, filed on Feb. 1, 2017.

(51) Int. Cl.
*H04N 13/261* (2018.01)
*G06T 11/60* (2006.01)
*G06T 11/00* (2006.01)

(52) U.S. Cl.
CPC .......... *H04N 13/261* (2018.05); *G06T 11/00* (2013.01); *G06T 11/60* (2013.01); *H04N 2213/003* (2013.01); *H04N 2213/006* (2013.01)

(58) Field of Classification Search
None
See application file for complete search history.

(56) References Cited

U.S. PATENT DOCUMENTS

| 5,594,841 A | 1/1997 | Schutz |
| 5,901,245 A | 5/1999 | Warnick et al. |
| 5,987,164 A | 11/1999 | Szeliski et al. |
| 6,507,364 B1 | 1/2003 | Bishay et al. |
| 6,631,207 B2 | 10/2003 | Hirota et al. |
| 6,721,461 B1 | 4/2004 | Nichani |
| 7,102,647 B2 | 9/2006 | Sloan et al. |
| 7,532,771 B2 | 5/2009 | Taylor et al. |
| 7,576,755 B2 | 8/2009 | Sun et al. |

(Continued)

OTHER PUBLICATIONS

Eaglemanm, David M., "Visual Illusions and Neurobiology", MacMillan Magazines Ltd. vol. 2,, pp. 920-926, Dec. 2001.

(Continued)

*Primary Examiner* — Iman K Kholdebarin
(74) *Attorney, Agent, or Firm* — JMB Davis Ben-David

(57) ABSTRACT

Disclosed herein is a method for generating a composite image, including using at least one hardware processor for obtaining at least two images; obtaining composite spatial data that identifies contiguity characteristics of each image of the at least two images; generating a template of the composite image, wherein the template provides a predetermined arrangement of the sections according to the contiguity characteristics identified in the image; sectioning the at least two images into predetermined number of sections according to the template; splicing the sections together according to the template; generating the composite image from the sections of the at least two images; wherein presence of at least one contiguity characteristic in each image generates an composite image that is ambiguous that can trigger an alternating switch in perception and awareness of each image scene and by establishing figure and ground relationship to create a depth illusion.

14 Claims, 8 Drawing Sheets

(56) References Cited

U.S. PATENT DOCUMENTS

| | | | |
|---|---|---|---|
| 7,686,769 B2 | 3/2010 | Caplygin | |
| 8,078,969 B2 | 12/2011 | Harrison | |
| 8,135,182 B2 | 3/2012 | Luo et al. | |
| 8,471,898 B2* | 6/2013 | Neuman | H04N 13/261 |
| | | | 348/51 |
| 8,737,769 B2 | 5/2014 | Finch et al. | |
| 9,275,486 B2 | 3/2016 | Minamihara et al. | |
| 9,754,163 B2 | 9/2017 | Segalovitz et al. | |
| 2004/0071349 A1 | 4/2004 | Harrington et al. | |
| 2004/0146201 A1 | 7/2004 | Sathyanarayana | |
| 2005/0146521 A1 | 7/2005 | Kaye et al. | |
| 2007/0291177 A1 | 12/2007 | Lahoz et al. | |
| 2008/0204548 A1 | 8/2008 | Goulanian et al. | |
| 2008/0205789 A1 | 8/2008 | Ten Kate et al. | |
| 2009/0003712 A1 | 1/2009 | Mei et al. | |
| 2009/0066786 A1* | 3/2009 | Landa | G02B 27/22 |
| | | | 348/54 |
| 2009/0297061 A1* | 12/2009 | Mareachen | G06T 11/00 |
| | | | 382/285 |
| 2010/0020160 A1* | 1/2010 | Ashbey | H04N 13/261 |
| | | | 348/43 |
| 2010/0080490 A1 | 4/2010 | Akiyama | |
| 2011/0074925 A1* | 3/2011 | Turner | H04N 13/261 |
| | | | 348/46 |
| 2011/0285748 A1 | 11/2011 | Slatter et al. | |
| 2012/0027294 A1 | 2/2012 | Krolczyk et al. | |
| 2012/0044241 A1* | 2/2012 | Chen | G06T 11/00 |
| | | | 345/419 |
| 2014/0307980 A1 | 10/2014 | Hilt | |
| 2015/0249815 A1* | 9/2015 | Sandrew | G06T 15/205 |
| | | | 348/47 |
| 2015/0358613 A1* | 12/2015 | Sandrew | G06T 15/205 |
| | | | 348/36 |
| 2019/0164293 A1* | 5/2019 | Ellison | G06T 7/136 |

OTHER PUBLICATIONS

Verbeek et al., "Line and Edge Detection by Symmetry Filters", 11th IAPR International Conference on Pattern Recognition, The Hague (The Netherlands), vol. III, 1992, 749-753.

Ren et al., "Figure/Ground Assignment in Natural Images", Lecture Notes in Computer Science, LNCS vol. 3952, 2006, 614-627.

Hramov et al., "Classifying the Perceptual Interpretations of a Bistable Image Using EEG and Artificial Neural Networks", Frontiers in Neuroscience, vol. 11, Art. 674, Dec. 2017.

Sachin et al., "Brain Tumor Detection Based on Bilateral Symmetry Information", Int. Journal of Engineering Research and Applications, ISSN: 2248-9622, vol. 4 Issue 6 (Version 3), Jun. 2014, pp. 98-103.

Guberman et al., "Gestalt and Image Understanding", Gestalt Theory, ISSN 0170-057 X, vol. 34, No. 2, 143-166.

* cited by examiner

SYSTEM AND METHOD FOR GENERATING COMPOSITE IMAGES

CROSS-REFERENCE TO RELATED APPLICATIONS

This application claims the benefit of priority to U.S. Provisional Patent Application No. 62/499,655, filed Feb. 1, 2017, and entitled "PHOTAGE 2.5D—METHOD AND SYSTEM FOR CREATING DYNAMIC VISUAL ILLUSIONS USING COMPLEX, JUXTAPOSED AMBIGUOUS IMAGES." The entirety of the aforementioned application is incorporated herein by reference.

BACKGROUND

The invention relates to the field of composite images.

Digital compositing is the process of digitally assembling multiple images to make a final image.

Ambiguous images are optical illusion images that exploit graphical similarities and other properties of visual system interpretation between two or more distinct image forms. Ambiguous images induce a phenomenon of multistable perception, which is the occurrence of an image being capable of providing multiple, yet stable, perceptions. The multistable perception can be constructed from multiple images combined to create a single composite image.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a method for generating a composite image, including using at least one hardware processor for obtaining at least two images; obtaining composite spatial data that identifies contiguity characteristics of each image of the at least two images; generating a template of the composite image, wherein the template provides a predetermined arrangement of the sections according to the contiguity characteristics identified in the image; sectioning the at least two images into predetermined number of sections according to the template; splicing the sections together according to the template; generating the composite image from the sections of the at least two images; wherein presence of at least one contiguity characteristic in each image generates an composite image that is ambiguous that can trigger an alternating switch in perception and awareness of each image scene and by establishing figure and ground relationship to create a depth illusion.

In certain embodiments the method further includes receiving user selections for at least one image of the at least two images.

In certain embodiments the method further includes displaying the composite image.

In certain embodiments the method further includes storing the composite image in an image database.

In certain embodiments, the contiguity characteristics include contiguity lines.

In certain embodiments, the sections are arranged in groupings that are arranged in a predetermined arrangement to generate the composite image.

In certain embodiments, the composite spatial data includes a complexity rating for determining the at least two images integrate for generating the composite image.

There is provided, in accordance with an embodiment, method for generating a composite image, including obtaining at least two images; obtaining composite spatial data that identifies contiguity characteristics of each image of the at least two images; generating a template of the composite image, wherein the template provides a predetermined arrangement of the sections according to the contiguity characteristics identified in the image; sectioning the at least two images into predetermined number of sections according to the template; splicing the sections together according to the template; and, generating the composite image from the sections of the at least two images, wherein presence of at least one contiguity characteristic in each image generates an composite image that is ambiguous that can trigger an alternating switch in perception and awareness of each image scene and by establishing figure and ground relationship to create a depth illusion.

There is provided, in accordance with an embodiment, a system for generating a composite image, including an image database configured to store at least two images for generating the composite image; a display configured to display the composite image; at least one hardware processor configured to: obtaining at least two images; obtaining composite spatial data that identifies contiguity characteristics of each image of the at least two images; generating a template of the composite image, wherein the template provides a predetermined arrangement of the sections according to the contiguity characteristics identified in the image; sectioning the at least two images into predetermined number of sections according to the template; splicing the sections together according to the template; generating the composite image from the sections of the at least two images; wherein presence of at least one contiguity characteristic in each image generates an composite image that is ambiguous that can trigger an alternating switch in perception and awareness of each image scene and by establishing figure and ground relationship to create a depth illusion.

In certain embodiments, the system further includes an input configured for receiving a user selection of at least two images for generating the composite image.

In certain embodiments, the sections are arranged in groupings that are arranged in a predetermined arrangement to generate the composite image.

In certain embodiments, the contiguity characteristics include contiguity lines.

In certain embodiments, the system further includes a communication interface configured to communicate with a third-party entity for obtaining images for generating the composite image.

In certain embodiments, the composite spatial data includes a complexity rating for determining the at least two images integrate for generating the composite image.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
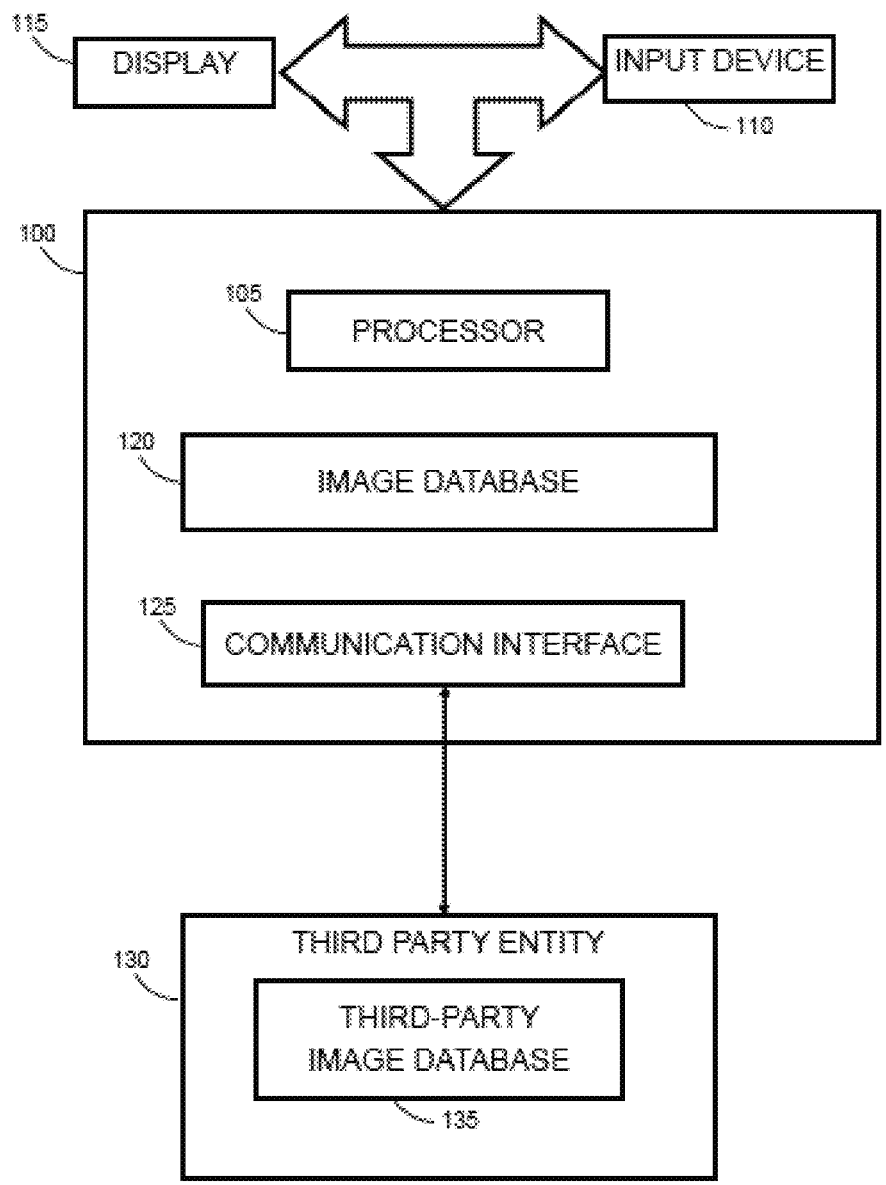
FIG. 1 schematically illustrates a system configured for generating a composite image, according to certain exemplary embodiments.

Disclosed herein is a system and method for generating a composite image, according to certain exemplary embodiments. The method can include the system obtaining at least two images that are sectioned into predetermined sections. The sections can be spliced together according to predefined contiguity characteristics of the at least two images to generate the composite image showing augmented characteristics. The composite image can be an ambiguous image set depending on the contiguity characteristics of the images used to generate the composite images. Ambiguous images can induce a phenomenon of multistable perception, which is the occurrence of an image being capable of providing multiple, yet stable, perceptions. The multistable perception can be constructed from multiple images combined to create a single composite image. The contiguity characteristics can be characteristics and/or features displayed in each image of the at least two images. In certain embodiments the contiguity characteristics can include contiguity lines that separate different color segments or different color blocks in the image, e.g. the edges between the color segments and/or color blocks.

In certain embodiments, the images display landscape scenes in which the contiguity characteristics, e.g. contiguity lines, are naturally occurring borderlines and/or horizon lines. The contiguity characteristics can represent edges that can separate color sections of the image, for example, between different parts of a background, a foreground, an object, and/or the like. The contiguity characteristics can enable a person viewing the image to mentally organize parts of the scene displayed in the image into different areas that can allow the viewer to recognize what is shown. The contiguity characteristics can provide a necessary contrast enabling the person's brain to organize the image and to resolve ambiguity in the image according to a viewer's perception of the composite image.

In certain embodiments, contiguity characteristics can occur naturally, e.g. as horizon lines in landscapes-type images, and are comprised of identifiable and recognizable objects, or parts of objects, based on their color and content contexts. For example, there is a natural horizon line between the sky and the field, juxtaposing a band of blue adjacent to a band of green at this interface which informs the mind to predict that the pattern can continue and can be attributed to being part of the sky and the field. Similarly, natural interfaces in landscapes can be identified, for example, between sky and ocean, sand and ocean, mountains and a field, mountain and sky, a branch and sky; water and field, and/or the like. These can represent images with one or two horizon lines, which can be contiguity characteristics. In certain embodiments landscape images can have a plurality of contiguity lines which are spatially separated and can include a combination of natural and/or man-made horizon lines, for example, bridge, water and sky, or water, grass-line and tree-line, or sky, ocean and sand, or mountains, cityscape and field, or the like.

Additional examples of man-made contiguity characteristics can include: a skyline with an outline of buildings, a railing-promenade interface, and/or the like. In certain embodiments where the image content and/or contiguity characteristics are more abstract in their representations and are not immediately or easily identifiable, the continuity of color and/or directionality can drive the re-assembly of the sectioned image in a viewer's perception while tracking across composite image sections. This can occur where there is sufficient color and/or content information contained in the contiguity characteristics to make the parts of the image identifiable and/or which can provide a viewer with the necessary visual information which allows the viewer to visually track across the contiguity characteristic in the image.

The sections of the at least two images can be sectioned in predetermined sizes.

The sections from the at least two images can then be spliced together in the predetermined arrangement, e.g. a predetermined order, to generate the composite image. The spliced sections are arranged to enable a viewer of the composite image to discern the different images of the at least two images in the composite image by can direct the viewer's eyes to the contiguity characteristics and can enable discerning the at least two images. In certain embodiments, the composite image can generate a hierarchical parsing of its content that corresponds to the perception of the whole image or sub-images that are used to generate the composite image. In certain embodiments, the composite image can be generated as a digital image or as a tangible image that can be assembled.

FIG. 1 schematically illustrates a system configured for generating a composite image, according to certain exemplary embodiments. The system 100 can include an input unit 110 configured to obtain a user input, e.g. a command. The input can be a command to select one or more images that are used to generate the composite image. In certain embodiments, the input can be parameters which the system requires for generating the composite image, e.g. number of sections the image is separated into, size of each section, and/or the like. In certain embodiments, input device 110 can be configured to be a camera for obtaining images that can be used for generating the composite image.

System 100 can include a display 115 configured to display the composite image to a viewer of the image. System 100 can include an image database 120 configured to store images for generating the composite images. In certain embodiments, image database 120 can be configured to store the composite images generated by system 100. System 100 can include a communication interface 125, e.g. a transceiver, configured to communicate with a third-party entity 130. In certain embodiments, the third-party entity can be a computerized device, for example, a server, smartphone, tablet, computer, or the like. Third-party entity 130 can include a third-party image database 135, which can be configured to store the images and composite images received from system 100. Third-party entity 130 can be configured to transmit images to system 100 or obtain images from system 100.

The system 100 can include a processor 105 configured to generate the composite image from the at least two images. In certain embodiments, processor 105 can be configured to obtain the at least two images. The at least two images can be selected according to a user selection of the images or according to predetermined parameters provided to system 100.

Figure 2:
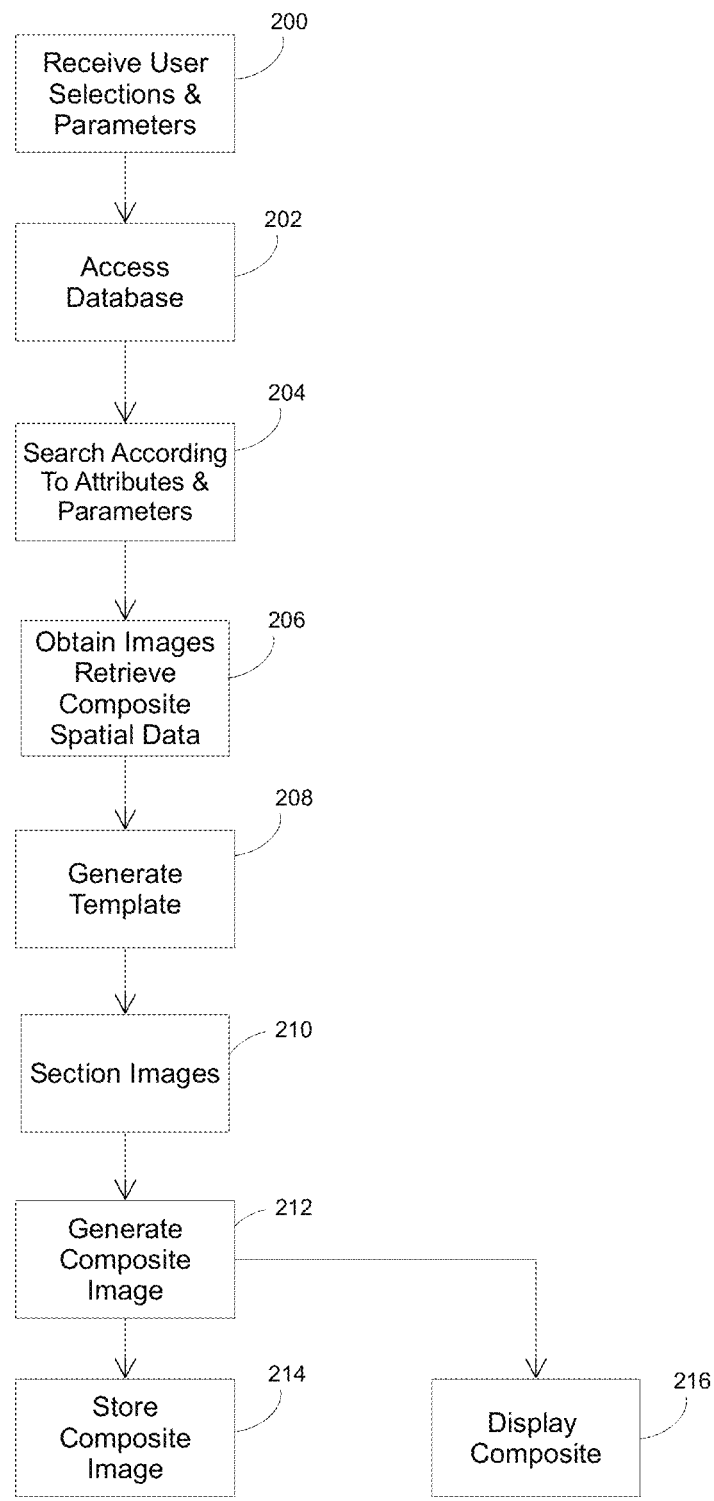
FIG. 2 schematically illustrates a method for generating a composite image, according to exemplary embodiments.

Processor 105 can be configured to implement the methods described herein in FIG. 2 for generating the composite image. Processor 105 can obtain the at least two images from the image database 120 and/or from the third-party entity 130 for generating the composite image. Each image of the at least two images can be obtained data stored with each image providing contiguity characteristics data that can be used to determine the arrangement of the at least two images in the composite image. The arrangement of sections in the composite image can induce a switching of percepts cause by the layering and depth resulting from the arrangement of the sections and the contiguity characteristics presented in the sections, e.g. the contiguity characteristics of the at least two images used for creating the sections.

FIG. 2 schematically illustrates a method for generating a composite image, according to certain embodiments. Step 200 discloses receiving user selections and parameters. In certain embodiments, system 100 can be configured to receive user selections, e.g. images the user selects to use for generating the composite image. The user selections can be received, for example, via input device 110, which can be a camera for providing the images. In certain embodiments, input device 110 can be a control, e.g. a keyboard, mouse, touchscreen, or the like, which enables the user to provide a command indicating which images stored in the image database 120 are to be selected for generating the composite image. In certain embodiments, step 200 can be optional and system 100 can be configured to select the images independent of a user.

Step 202 discloses accessing image database. In certain embodiments, system 100 can be configured to access image database 130 to obtain at least two images from image database, e.g. from image database 120 or third-party image database 135 when the image is received by system 100 from third-party entity 130.

Step 204 discloses obtaining images and composite spatial data, according to predetermined attributes and parameters. In certain embodiments, system 100 can be configured to obtain the at least two images and the composite spatial data of each image according to the predetermined attributes and parameters. The predetermined parameters can include complexity rating of the composite image, a size of the composite image, the number of images to be used in generating the composite image, the number of sections each image needs to be separated into, and/or the like. In certain embodiments, a user of system 100 can provide the predetermined attributes and parameters as well as a selection of the images to use in generating the composite image prior to generating the composite image. The complexity rating can be a predefined rating of the images used to generate the composite image of how well the images can integrate with other images of the at least two images for generating the composite image. In certain embodiments, the complexity rating can be defined by a user, through image processing of the image prior to use of the image for generating the composite image. The composite spatial data can include the contiguity characteristics of the image, the scenery displayed in the image, a background of the image, a foreground of the image, and/or the like.

Section 208 discloses generating a template of the composite image. In certain embodiments, system 100 can be configured to generate the template of the composite image. The template can designate the parameters of the composite image to be generated, for example, size of the composite image, number of sections each image is segmented into, and/or the like. In certain embodiments, the template can designate the order in which the sections are arranged, for example, which section from which image is placed within the order of the sections, and/or the like. The template can be generated according to the composite spatial data, which can enable designating the order of the images, the placement of the images within the composite image, a complexity of the composite image, and/or the like.

Step 210 discloses serially sectioning the images. In certain embodiments, system 100 can be configured to serially section the at least two images in according to predetermined parameters, such as a width of each section, the number of sections per image, aspect ratio of each section, a rotation angle of each section, and/or the like. In certain embodiments, the predetermined parameters can provide that the sections of each image include different parameters, e.g. each image section can be of a different width, each image can be sectioned into a different number of sections, and/or the like. In certain embodiments, the sections can vary in size, e.g. width, length, or the like of any of individual section from a same image, between images, or the like, to create a step-ladder effect across a bottom or top of a juxtaposition, which can provide an additional dimension to the visual illusion.

Step 212 discloses generating the composite image. In certain embodiments, system 100 can be configured to generate the composite image. The composite image can be generated by splicing the serially sections of the images in the predetermined arrangement. In certain embodiments, the sections can be spliced in groupings according to the number of images used to generate the composite image. Once the sections are spliced in the grouping, the groupings can be arranged to and spliced to create the complete composite image.

Step 214 discloses storing the composite image. In certain embodiments, system 100 can be configured to store the composite image, for example in the image database 120. In certain embodiments, system 100 can be configured to transfer the composite image, e.g. via communication interface 125, to third-party entity 130 to be stored in third-party image database 135.

Step 216 discloses displaying the composite image. In certain embodiments, system 100 can be configured to display the composite image on display 115. In certain embodiments, system 100 can be configured to transfer the composite image to third-party entity 130, which can display the composite image.

Figure 3A:
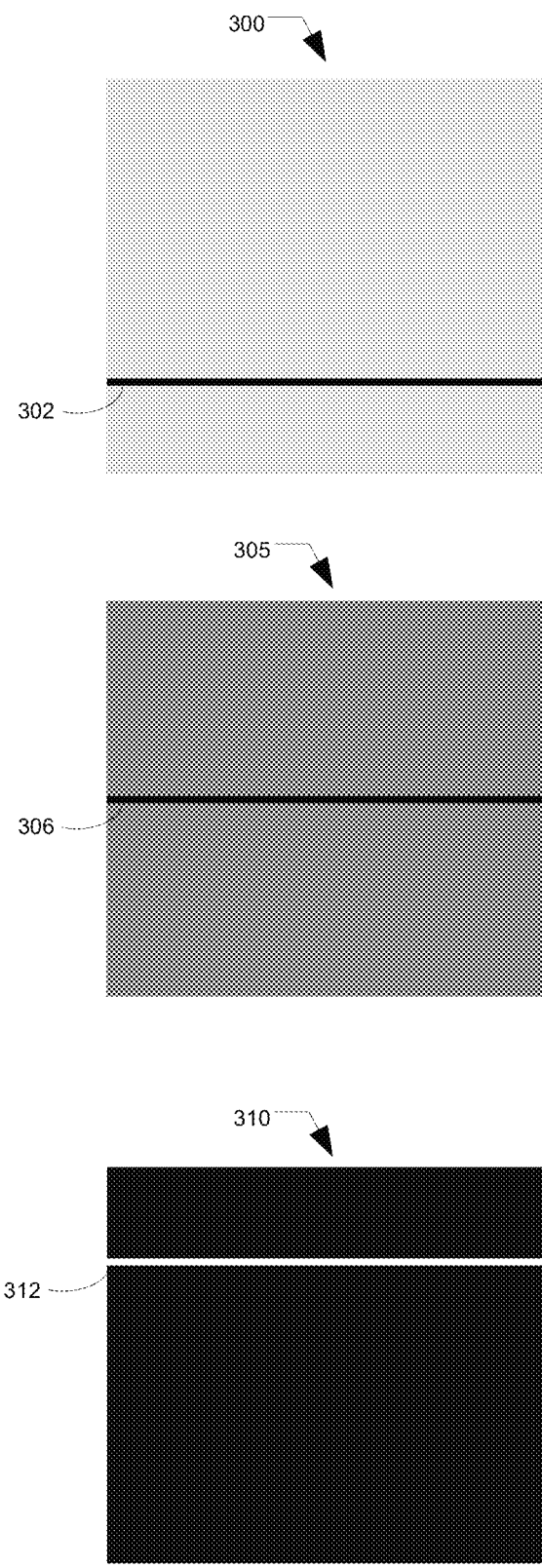
FIGS. 3A-3G show explanatory diagrams describing an arrangement of sections of at least two images for generating a composite image, according to certain embodiments; and, FIGS. 4A-4C show composite images including a depth illusion and/or a multistable image scene in a composite image, according to certain embodiments.

FIGS. 3A-3G show explanatory diagrams describing an arrangement of sections of at least two images for generating a composite image, according to certain embodiments. Referring to FIG. 3A showing at least two images, e.g. three images, for generating the composite image, according to certain embodiments. The three images can include a first image 300, a second image 305, and a third image 310. Each image can include at least one contiguity characteristic, e.g. as a contiguity line. For example, first image 300 can include a contiguity line 302; second image 305 can include a contiguity line 306, and third image 310 can include a contiguity line 312.

Figure 3B:
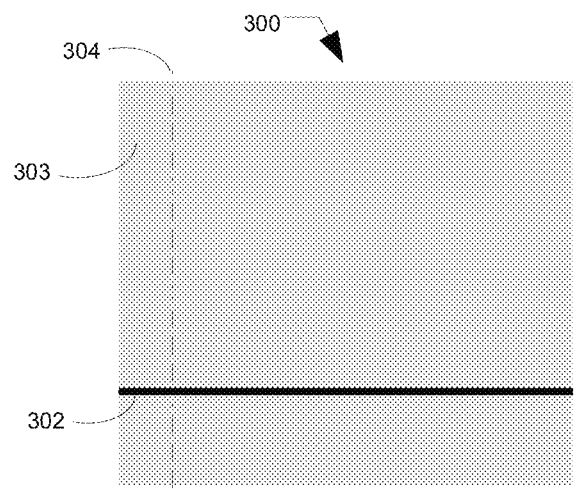
Figure 3B:
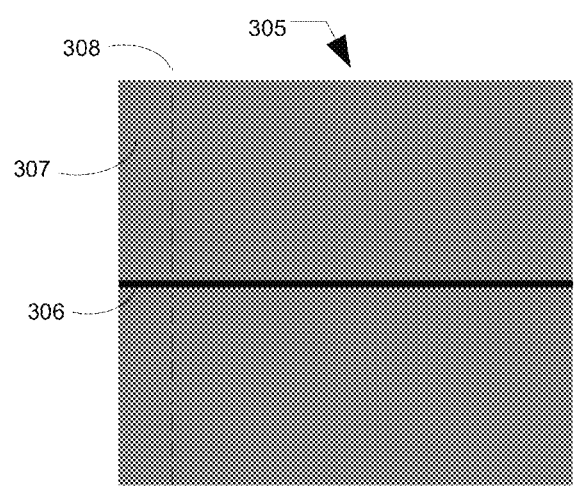
Figure 3B:
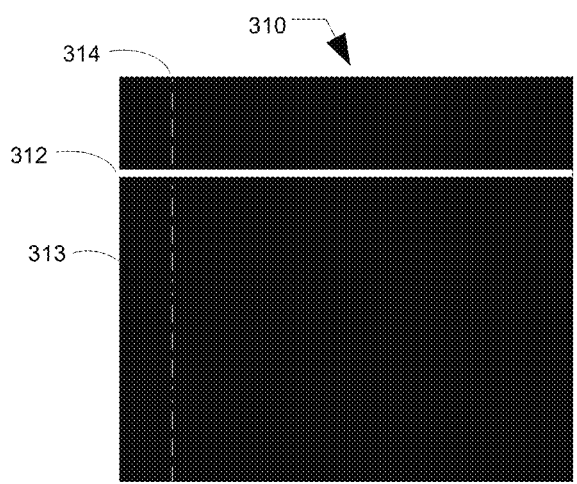

Referring to FIG. 3B showing sectioning a first section of each image of the three images, according to certain embodiments. System 100 can be configured to section each image, for example a first sectioning of each image, e.g. first image first section 303, second image first section 307, and third image first section 313, represented herein as sectioned by sectioning lines 304, 308, 309, 314. In certain embodiments, the sectioning can be achieved by generating a definite edge for each section to enable system 100 to identify the sectioning location, e.g. where each section is separated from the respective image.

Figure 3C:
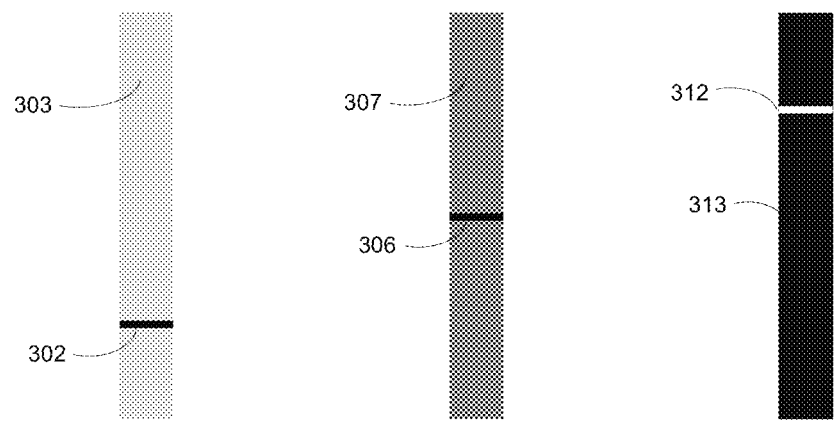

FIG. 3C shows the first section of the three images, according to certain embodiments. The first sections 303, 307, 313 are sectioned off from their respective images, e.g. first image 300, second image 305 and third image 310 respectively.

Figure 3D:
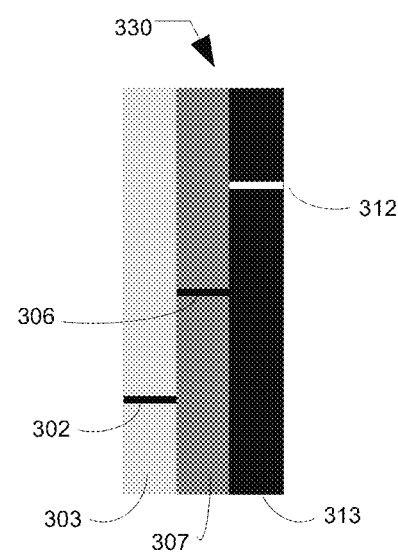

FIG. 3D shows splicing the first sections 303, 307, 313, according to certain embodiments. The three sections, e.g. first image first section 303, second image first section 307, and third image first section 313 are combined and arranged in a predetermined order. The predetermined order can be an order in which the contiguity lines are not on the same vertical line. In certain embodiments, the predetermined order is a grouping of first sections 303, 307, 313, e.g. first grouping 930, is generated according to the template generated by system 100. In certain embodiments, the arrangement of first sections 303, 307, 313 can be determined according to which image of the three images is designated as a background image, according to the contiguity characteristics of the images, a color scheme of the image, objects in the image, and/or the like.

Figure 3E:
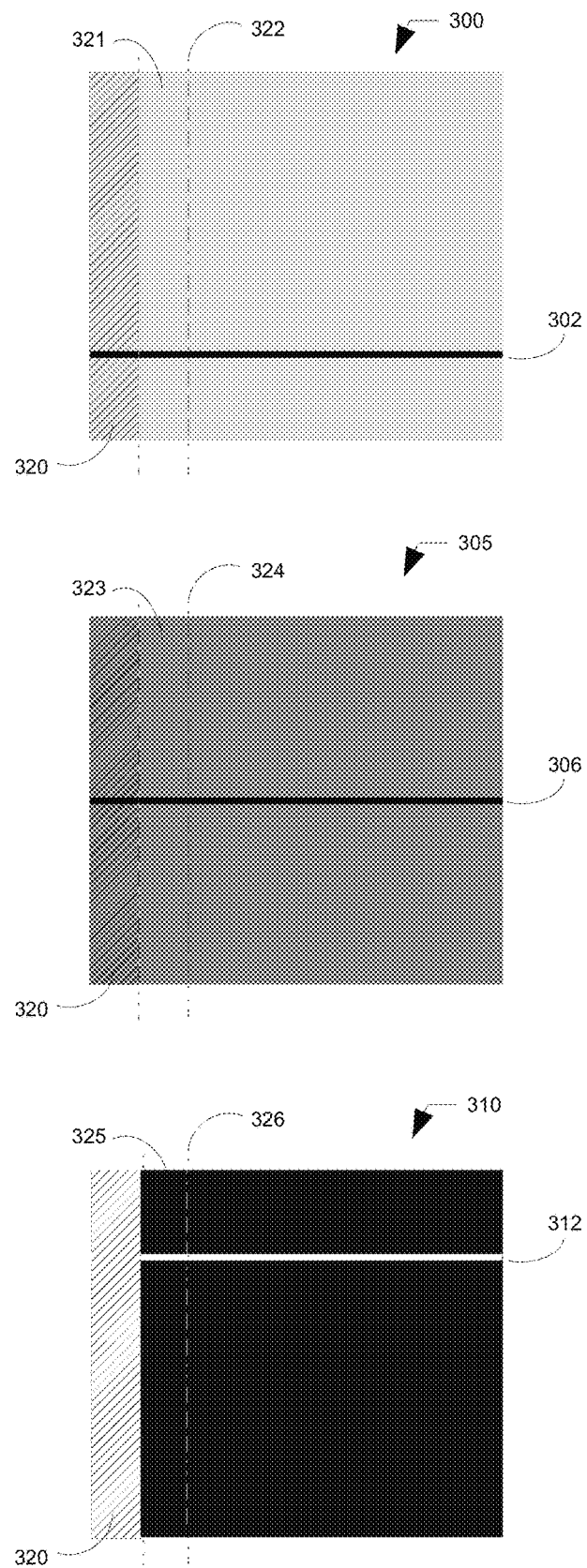

FIG. 3E shows sectioning a second section of each image, according to certain embodiments. After first sections 303, 307, 313 are removed, each image can include a deleted section 320. Second sections 322, 324, 326 can be sectioned from first image 300, second image 305, and third image 310, respectively.

Figure 3F:
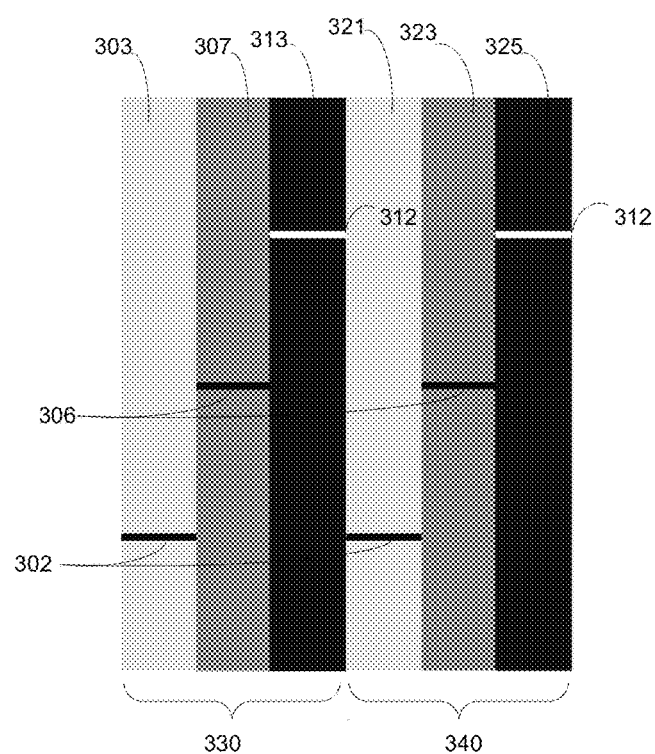

FIG. 3F shows splicing the second section of each image of the three images subsequent to the first sections' combination. Second sections 322, 324, 326 can be spliced to create a second grouping 940 from second sections 322, 324, 326. Second grouping 940 can be arranged subsequent to first grouping 930.

Figure 3G:
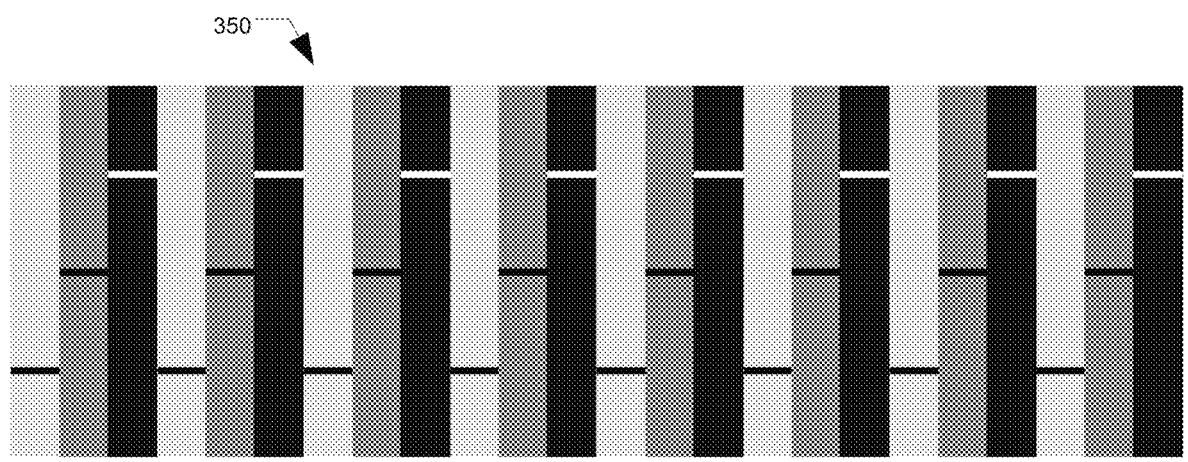

FIG. 3G shows a composite image 950 constructed from the sections of the three images, according to certain embodiments. After the three images are all separated into the predetermined number of sections and the sections are spliced to generate the necessary number of groupings, all groupings can be arranged in the predetermined arrangement according to the generated template of Step 206 of FIG. 2. Once all the groupings are arranged according to the template, the composite image 950 can be generated with the sections in the predetermined arrangement.

Figure 4A:
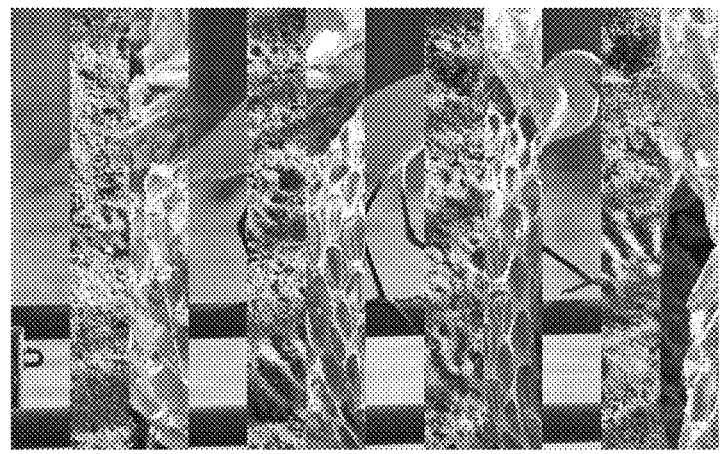
Figure 4B:
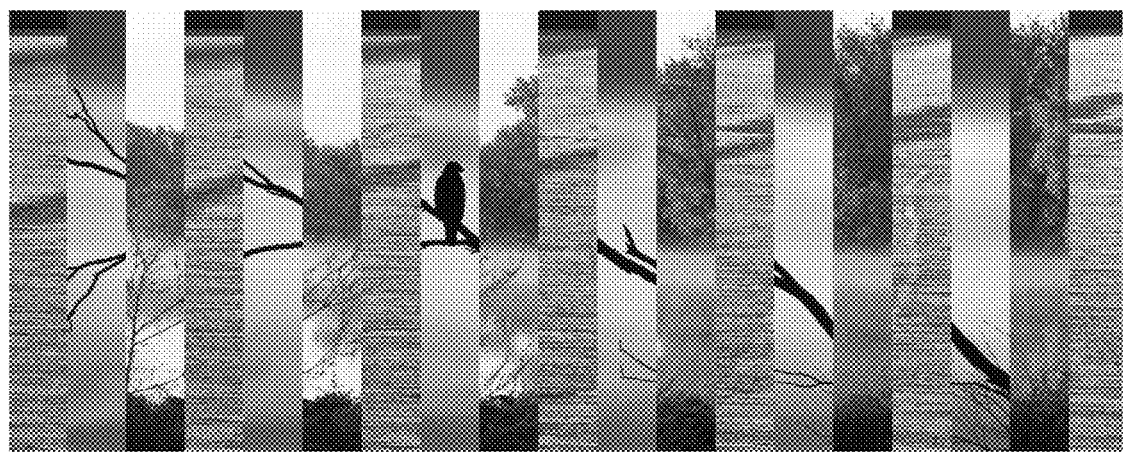
Figure 4C:
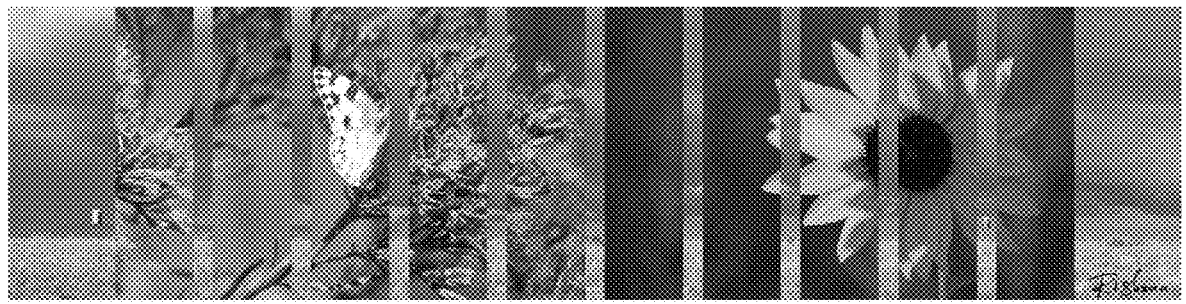

FIGS. 4A-4C show composite images including a depth illusion and/or a multistable image scene in a composite image, according to certain embodiments. Referring to FIG. 4A showing a composite image is constructed from three separate images, where two images show natural scenes and a third image is a nature scene where the contiguities in the image are caused by a constructed object, e.g. a railing. In certain embodiments, two of the images can lack clear defined contiguities, and the third image with a clear contiguity enables creating the separation between the images in the composite image to allow the view to differentiate the sections and construct the images from the composite image by establishing figure and ground relationship to create a depth illusion.

In certain embodiments, two of the images can lack clear defined contiguities, and the third image with a clear contiguity enables creating the separation between the images in the composite image can allow the viewer to differentiate the sections and construct the images from the composite image by establishing figure and ground relationships. One of the images in composite image can provide a "background" image, which includes a contiguity characteristic that tracks across the entire composite image. The other two images of the composite image can be juxtaposed independently with the designated background image. The interspersed segments including the background image do not disrupt the integrity of the other two images and switching per se does not occur per se. However, a viewer viewing the image can track across the image set and visually reassemble the sectioned background image. The composite image can provide an illusion of depth combined with dynamically shifting perspectives that are integrated with identifiable elements as part of the images. The images can be implemented for use in interactive games to support brain health and/or fitness for people across the visual cognition spectrum, and/or whose conditions may impact memory-related processes, depth perception, tracking and/or processes associated with visual-spatial cognition. The combination illusion of depth and the presence of more than one contiguity characteristic in the composite image can be responsible for the perception shifting effect related to a psychological phenomenon associated with ambiguous perception of bi/tristable images.

Referring to FIG. 4B showing a composite image where three nature scenes each include a contiguity characteristic, and the patterns and content in the sections provide the differentiating characteristics that enable recognizing the different images in the composite. The presence of at least one defined contiguity characteristic, e.g. a contiguity line, in each of the nature image scenes generates an ambiguous image set which can trigger an alternating switch in perception and awareness of the image scenes.

Referring to FIG. 4C showing a composite image where three nature scenes are arranged as sidebar portions of the composite image to inform the small sections in between the sections from the other images used to generate the composite image.

The composite images of FIGS. 4A-4C can be implemented for psychological testing and assessments, for example, the images used are composed complex natural scenes. The composite image can include hyphenated image segments spatially separated, and which can target a viewer's cognitive capacity. A viewer's perception of these reassembled images is informed in part by color and/or content information embedded in the contiguity characteristics, e.g. representations of real-world objects, landscapes, scenes, and/or the like with recognizable attributes and features that can be memorable and part of a viewer's memory.

In certain embodiments, sections of the at least two images used for generating the composite image can be viewed as individual puzzle pieces that can be reassembled to create the composite image, e.g. in a puzzle game. The ability to recognize the parts of a whole image within the composite image, the sections of each image, can be a top-down process and can be combined with a bottom-up processing of a presented input stimulus, i.e. of looking at the images and visually engaging and/or manually working through a "puzzle", e.g. composite image, and any associated interactivities to discern a pattern directly from the composite image.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generating a composite image, including using at least one hardware processor for:
   obtaining at least two images;
   obtaining composite spatial data that identifies contiguity characteristics of each image of the at least two images;
   generating a template of the composite image, wherein the template provides a predetermined arrangement of the sections according to the contiguity characteristics identified in the image;
   sectioning the at least two images into predetermined number of sections according to the template;
   splicing the sections together according to the template;
   generating the composite image from the sections of the at least two images;
   wherein presence of at least one contiguity characteristic in each image generates a composite image that is ambiguous that can trigger an alternating switch in perception and awareness of each image scene and by establishing figure and ground relationship to create a depth illusion.

2. The method according to claim 1, further including receiving user selections for at least one image of the at least two images.

3. The method according to claim 1, further including displaying the composite image.

4. The method according to claim 1, further including storing the composite image in an image database.

5. The method according to claim 1, wherein the contiguity characteristics include contiguity lines.

6. The method according to claim 1, wherein the sections are arranged in groupings that are arranged in a predetermined arrangement to generate the composite image.

7. The method according to claim 1, wherein the composite spatial data includes a complexity rating for determining the at least two images integrate for generating the composite image.

8. A method for generating a composite image, including:
   obtaining at least two images;
   obtaining composite spatial data that identifies contiguity characteristics of each image of the at least two images;
   generating a template of the composite image, wherein the template provides a predetermined arrangement of the sections according to the contiguity characteristics identified in the image;
   sectioning the at least two images into predetermined number of sections according to the template;
   splicing the sections together according to the template; and,
   generating the composite image from the sections of the at least two images,
   wherein presence of at least one contiguity characteristic in each image generates a composite image that is ambiguous that can trigger an alternating switch in perception and awareness of each image scene and by establishing figure and ground relationship to create a depth illusion.

9. A system for generating a composite image, including:
   an image database configured to store at least two images for generating the composite image;
   a display configured to display the composite image;
   at least one hardware processor configured to:
   obtaining at least two images;
   obtaining composite spatial data that identifies contiguity characteristics of each image of the at least two images;
   generating a template of the composite image, wherein the template provides a predetermined arrangement of the sections according to the contiguity characteristics identified in the image;
   sectioning the at least two images into predetermined number of sections according to the template;
   splicing the sections together according to the template;
   generating the composite image from the sections of the at least two images;
   wherein presence of at least one contiguity characteristic in each image generates a composite image that is ambiguous that can trigger an alternating switch in perception and awareness of each image scene and by establishing figure and ground relationship to create a depth illusion.

10. The system according to claim 9, further including an input configured for receiving a user selection of at least two images for generating the composite image.

11. The system according to claim 9, wherein the sections are arranged in groupings that are arranged in a predetermined arrangement to generate the composite image.

12. The system according to claim 9, wherein the contiguity characteristics include contiguity lines.

13. The system according to claim 9, further including a communication interface configured to communicate with a third-party entity for obtaining images for generating the composite image.

14. The system according to claim 9, wherein the composite spatial data includes a complexity rating for determining the at least two images integrate for generating the composite image.

* * * * *